Jan. 16, 1923.
T. C. BRASKET.
LOCKING MEANS FOR AUTOMOBILES.
FILED JUNE 9, 1919.
1,442,120.
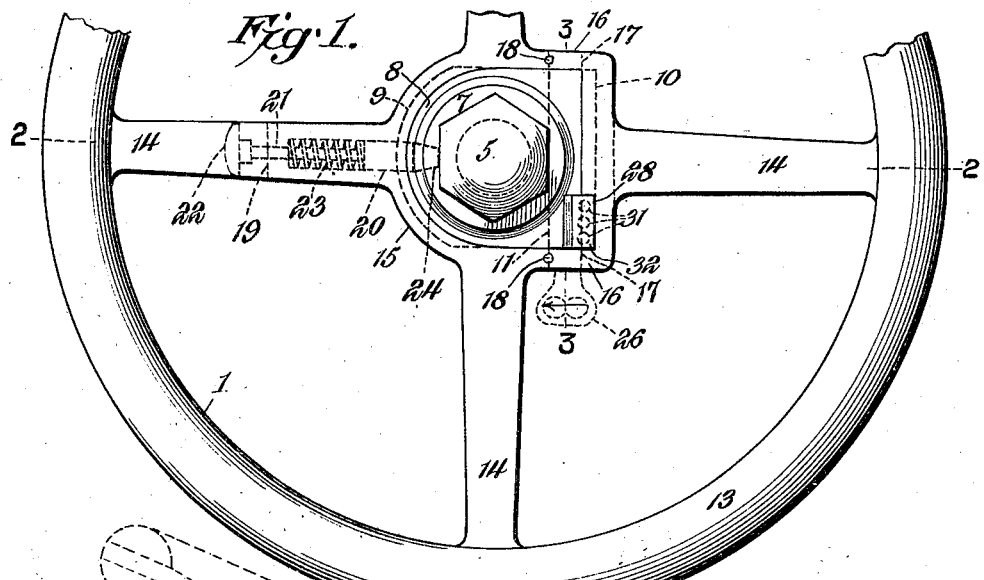
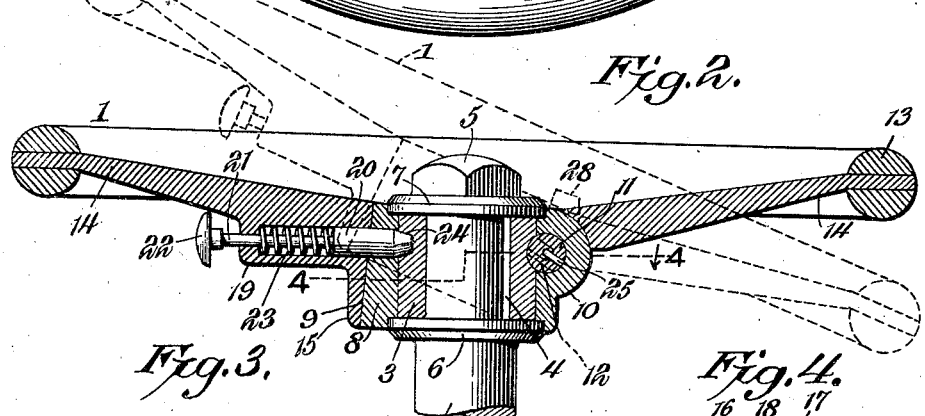
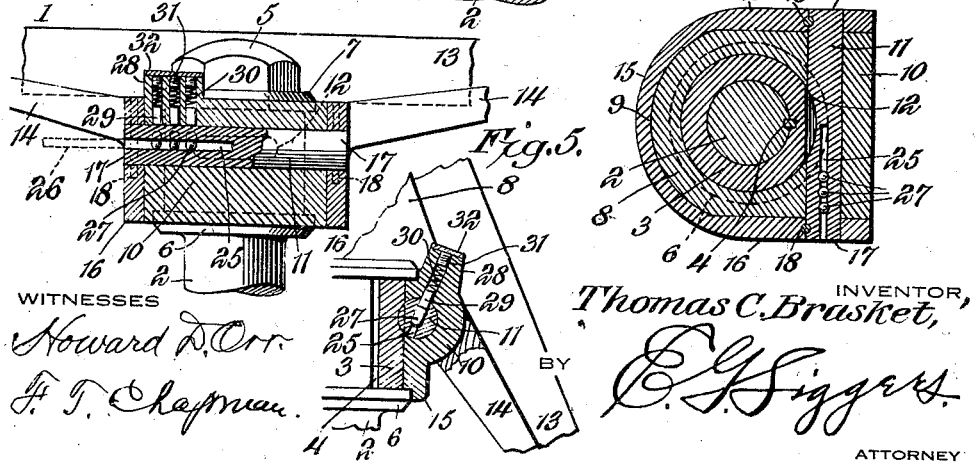
WITNESSES
Howard D. Orr
F. T. Chapman
INVENTOR,
Thomas C. Brasket,
BY
E. G. Siggers
ATTORNEY Patented Jan. 16, 1923.

1,442,120

UNITED STATES PATENT OFFICE.

THOMAS C. BRASKET, OF ANDERSON, INDIANA, ASSIGNOR TO ERNEST N. HILL, OF ANDERSON, INDIANA.

LOCKING MEANS FOR AUTOMOBILES.

Application filed June 9, 1919. Serial No. 302,851.

*To all whom it may concern:*

Be it known that I, THOMAS C. BRASKET, a citizen of the United States, residing at Anderson, in the county of Madison and State of Indiana, have invented a new and useful Locking Means for Automobiles, of which the following is a specification.

This invention has reference to locking means for automobiles, and is designed more particularly to provide a lock whereby the steering wheel of the automobile is freed from connection with the steering mechanism carried by the steering column so that when the vehicle is locked the steering assembly is out of control and therefore the vehicle cannot be driven under its own power, or even pushed from place to place except with great difficulty.

In accordance with the invention, the steering wheel, in the normal steering position, is secured to the steering connections of the steering assembly so that the steering may be performed in the usual manner, but in such position of the steering wheel the lock requires the presence of a key and the latter must remain in the lock. On leaving the vehicle and therefore locking it, the steering wheel is moved out of the axis of the steering post, either by tilting the steering wheel upwardly for underneath control or downwardly for overlying control, and when the wheel is in such tilted position the key may be removed, thereby causing the fastening of the wheel in such tilted position, and. furthermore, the arrangement is such that when the wheel is tilted it is loose upon the steering post for rotation independently of the steering mechanism.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing:—

Figure 1 is a plan view of an automobile steering wheel with the invention applied.

Figure 2 is a section on the line 2—2 of Figure 1.

Figure 3 is a section on the line 3—3 of Figure 1.

Figure 4 is a section on the line 4—4 of Figure 2.

Figure 5 is a section similar to Figure 2, but showing the wheel fully tilted and locked.

Referring to the drawing, there is shown an automobile steering wheel 1 and a steering shaft or arbor 2 for carrying it. No attempt is made in the drawing to show any particular type of steering wheel and carrier therefor, since these features vary considerably in different makes of automobiles, so the showing of the drawing may be taken as indicative of any of a variety of steering wheels and their supporting arbors. Some makes of automobiles are provided with the fuel and spark controls above the steering wheel and others have the controlling levers below the steering wheel. These controlling levers are not shown in the drawing for the invention has nothing to do with such parts of an auto- mobile.

It is to be understood that the post or arbor 2 is customarily slanted in automobiles and the steering wheel 1, when in position for steering purposes, is likewise slanted or tilted instead of being arranged as shown in the drawing, which showing has been adopted to permit a closer assemblage of the figures than would otherwise be feasible. Fixed to the upper end of the arbor 2 is a collar 3 held thereto by a key or spline 4 and a nut 5 so that the arbor 2 and collar 3 are effectively one-piece. The arbor is provided with a circumferential flange 6 forming a step bearing or abutment for the collar 3 and the nut 5 is provided with a flange 7, or this flange may be replaced by a washer to confine the collar 3 to the flange 6. Surrounding the collar 3 is a sleeve 8 having one end portion 9 tapered and the opposite end portion enlarged, as shown at 10.

Traversing the enlargement 10 and in part encroaching tangentially on the collar 3 is a pin 11 having a cut-out 12 on one side intermediate of its length and conforming to the circumferential shape of the collar 3 so that when the cut-out in the pin is opposite the collar the fact that the pin is in tangentially traversing relation to the collar does not interfere in any manner with relative rotation of either the collar 3 or the sleeve 8 one about the other. The wheel 1 has a rim portion 13 connected by spokes 14 to a hub 15, which latter embraces the sleeve 8 and has side portions 16 parallel one to the other and hugging opposite sides of the sleeve 8, which opposite sides are also parallel to each other, and have the ends of the pin 11 projecting through them as shown at 17. The projecting ends 17 of the pin 11 are secured to the side portions 16 so as to turn therewith. This may be done by forming the ends of the pin with tangential slots and driving lock pins 18 therethrough. Of course other means may be employed for the same purpose which is to hold the pin 11 in firm relation to the hub 15. The pin 11 constitutes a pivot or fulcrum pin for the steering wheel 1 and the pin 11 turns with the steering wheel about an axis lateral to the length of the steering post 2, permitting the steering wheel 1 to be tilted from its normal working position to a nearly or quite upright position. In Figure 2 the steering wheel, as shown in full lines, may be assumed to be in the normal partially tilted position and to be shown in dotted lines as having been moved from the normal position toward the full tilted position but not yet having reached such last-named position.

The taper portion 9 of the hub of the steering wheel is such as to permit tilting of the steering wheel about the axis of the pivot pin 11. An appropriate one of the spokes 14 is formed with a boss 19 in which there is housed a pin 20 having a stem 21 extending outside of the boss and there provided with a push-button or head 22. A spring 23 within the boss tends to constantly urge the pin toward the normal axis of turning of the wheel with the steering post. The pin 20 is of sufficient length to pass through the sleeve 8 and enter a socket 24 in the collar 3. When the pin 20 is withdrawn to a sufficient extent to leave the socket 24 and clear the sleeve 8, the wheel may be tilted, with the pin 11 as an axis, in a rising direction. The showing of the drawing is that of an arrangement permitting the use of tiltable steering wheels where the spark and fuel controls are below the steering wheel. Where the contrary is the case, that is where the spark and fuel controls are above the steering wheel, the parts permitting the tilting of the wheel are reversed without other material change.

The pin 11 has a longitudinal key-receiving slot 25 of suitable length, width and depth to take in the corresponding portion of a key 26 which may be of burglar-proof type and similar to the well known Yale lock keys. The pin 11 may correspond to the pin barrel of a lock of the Yale type and carries a series of pins or tumblers 27 while the enlargement 10 is provided with a boss 28 in which are lodged corresponding tumblers or followers 29 each urged toward the key slot by a spring 30 back of which is the usual holding plug or screw 31. The plugs 31 may be held in place by a cap plate 32 or any other suitable means for retaining the parts may be employed.

The pin or barrel 11 differs from similar devices used in locks in that it constitutes a pivot fast to and movable with the pivoted member and is not independently turned by a key as is the habit in pin barrel locks. The arrangement is such that when the steering wheel is in the normal running position the locking pin 20 is seated in the socket 24, thus holding the wheel in proper relation to the post 2. Furthermore, the pin 11 is so turned about its longitudinal axis that a suitable portion of the pin is lodged in the collar 3 in tangential relation thereto so that the sleeve 8, hub 15 and collar 3 are all locked together and to the steering post 2, the several parts being of ample area and bulk to withstand the strains of steering.

When the steering wheel is tilted to or nearly to a position of parallelism with the steering post, the pins 27 are brought into coincidence with the followers 29 and these followers then advance into the pin 11 sufficiently to span the joint between the pin 11 and the part of the sleeve 8 carrying the followers. This forms an effective lock with the pins 27 entering the pin 11 radially for a sufficient extent in traversing relation to the key slot. The wheel is therefore positively locked in the extreme tilted position in the absence of the key. On introducing the key into the key slot the pins 27 are forced toward the surface of the pin 11 until the ends of the pins 27 engaging the tumblers 29 coincide with the joint between the surface of the pin 11 and the surface of the passage housing the pin 11. This permits the turning of the wheel from its extreme tilted position toward the working position but with the key lodged in the key slot from which it cannot be removed so long as the pins 27 are out of register with the tumblers 29. It is therefore necessary that the key remain in the slot in the pin 11 while the steering wheel is being used for steering purposes and is held by the pin 20 in the steering position.

The automobile lock is of a nature putting the steering wheel wholly out of commission, the wheel being freely turnable without in any manner affecting or engaging the steering post or arbor, and, furthermore, locked in the extreme tilted position where it cannot be employed for steering purposes, but provides ample room for an operator to enter or leave the vehicle on the steering wheel side where ordinarily the room is very limited.

A steering wheel lock of the type permitting the disconnection of the steering wheel from the rest of the steering assembly, so that the wheel will simply rotate idly, is advantageous in not only preventing steering of the automobile by driving it off under its own power but renders pushing of the automobile or even towing of the automobile extremely difficult because of the lack of control of the steering wheels. The invention has the further advantage of providing means for indicating visibly that the steering wheel is out of commission by the steering wheel being tilted to a position approximately parallel with the steering post, or in any event materially removed from its ordinary well recognized operative position. The lock of the invention therefore not only renders it out of the question to operate the vehicle by its own power because of inability to steer, but would indicate to observers that anyone attempting to move the vehicle was in all probability doing so wrongfully, thus inviting investigation with the probability of apprehension.

What is claimed is:—

1. In an automobile provided with a tiltable steering wheel, a key lock for holding the steering wheel in the tilted position, the wheel and part carrying it having co-acting locking devices, in part participating in the tilting movements of the wheel, and shaped to release the key when the wheel is tilted and to retain the key when the wheel is in normal steering position.

2. In an automobile provided with a tiltable steering wheel, a pivot or hinge pin for the steering wheel, said pin carrying lock elements, and co-acting lock elements carried by the portion of the automobile upon which the steering wheel is tiltable, said lock elements being key-operated and operable to lock the wheel when in its tilted position, and prevent its return to its normal position until the key is inserted.

3. In an automobile provided with a tiltable steering wheel, a pivot or hinge pin for the steering wheel, said pin carrying lock elements, and co-acting lock elements carried by the portion of the automobile upon which the steering wheel is tiltable, said co-acting lock elements having a normal tendency to move to locking position and responsive to the insertion of a key to move to the unlocked position.

4. The combination of a steering post, a sleeve thereon, a steering wheel having its hub fitting the sleeve, and a key-operated lock pin or barrel arranged tangentially relative to the hub and sleeve for locking the parts together, said lock pin or barrel being located on one side of the sleeve and said wheel hub having a latch pin on the opposite side of the sleeve from the lock pin or barrel.

5. An automobile lock comprising a steering wheel tiltable from an operative position, and a lock actuated by the tilting of the wheel to lock the wheel in the tilted position, said wheel also having means for disconnecting it when in the tilted position from the steering assembly of the automobile.

6. An automobile lock comprising a steering wheel tiltable from an operative position, means for holding the wheel in the operative position and releasing it therefrom, and a lock for connecting the wheel to the steering assembly when the wheel is in steering position and disconnecting it therefrom when in the tilted position, said lock having locking elements responsive to the insertion of a key with the locking elements constructed to move to the locking position on the tilting of the wheel away from steering position.

7. An automobile lock comprising a tiltable steering wheel movable from a normal steering position and having a hinge connection permitting the tilting of the wheel, said hinge connection being provided with key responsive locking and unlocking means, and also having means for connecting and disconnecting the steering wheel from the steering assembly of the automobile, said last-named means being responsive to the tilting movements of the steering wheel and timed to connect the wheel to the steering assembly when the wheel is in steering position.

8. An automobile lock comprising a tiltable steering wheel having a normal steering position, a hinge connection carrying the steering wheel and provided with a hinge or pivot pin, said pin and the part of the steering assembly carrying the wheel having co-acting means for connecting the wheel to and disconnecting it from the steering assembly, and key-responsive means in part carried by the pin and in part carried by the portion of the steering assembly associated with the pin, and said pin participating in the tilting movements of the wheel and timed in action to cause the locking of the wheel in the tilted position and simultaneously therewith its disconnection from the associated parts of the steering assembly.

9. The combination of a steering post, a sleeve thereon, a steering wheel with the hub mounted on the sleeve, a lock pin or barrel arranged tangentially to the sleeve and hub and engaging both to constitute a pivotal axis for the wheel, and a latch pin for connecting the hub and sleeve on the opposite side of the steering post from the lock, said latch pin being radially disposed and the lock pin or barrel being tangentially disposed with relation to the longitudinal axis of the steering post.

10. An automobile lock comprising a steering wheel tiltable from the steering position, and a lock provided with a lock pin or barrel constituting a pivot for the tiltable steering wheel and arranged tangentially to the steering axis, and a latch device for holding the steering wheel in the steering position and disposed radially to the steering axis.

11. In an automobile provided with a tiltable steering wheel, a pivot or hinge pin for the steering wheel, said pin and that part of the wheel adjacent the pin having coacting key-operated locking devices, said devices being operable to release the key when the wheel is tilted and to retain the key when the wheel is in normal steering position, said wheel being locked by said devices when in a tilted position.

In testimony, that I claim the foregoing as my own, I have hereto affixed my signature.

THOMAS C. BRASKET.

Witnesses:
MATTIE P. HORN,
JAMES T. CLAMAN.